United States Patent
Onac et al.

(10) Patent No.: US 10,806,095 B2
(45) Date of Patent: Oct. 20, 2020

(54) HORTICULTURAL LIGHTING APPARATUS

(71) Applicant: SIGNIFY HOLDING B.V., Eindhoven (NL)

(72) Inventors: Gabriel-Eugen Onac, Veldhoven (NL); Marcellinus Petrus Carolus Michael Krijn, Eindhoven (NL); Esther Maria Van Echtelt, Wageningen (NL); Céline Catherine Sarah Nicole, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 544 days.

(21) Appl. No.: 15/326,785

(22) PCT Filed: Jun. 4, 2015

(86) PCT No.: PCT/EP2015/062485
§ 371 (c)(1),
(2) Date: Jan. 17, 2017

(87) PCT Pub. No.: WO2016/008638
PCT Pub. Date: Jan. 21, 2016

(65) Prior Publication Data
US 2017/0202157 A1    Jul. 20, 2017

(30) Foreign Application Priority Data
Jul. 17, 2014    (EP) ..................................... 14177493

(51) Int. Cl.
*A01G 7/04*    (2006.01)
*H05B 47/11*    (2020.01)
(Continued)

(52) U.S. Cl.
CPC ............... *A01G 7/045* (2013.01); *A01G 9/14* (2013.01); *A01G 9/20* (2013.01); *H05B 47/105* (2020.01);
(Continued)

(58) Field of Classification Search
CPC . A01G 7/045; A01G 9/26; A01G 9/14; A01G 9/20; A01G 9/24; A01G 25/167;
(Continued)

(56) References Cited

U.S. PATENT DOCUMENTS

| | | | | |
|---|---|---|---|---|
| 4,255,897 A | * | 3/1981 | Ruthner | A01G 7/045 47/65 |
| 2010/0020536 A1 | * | 1/2010 | Bafetti | F21K 9/00 362/231 |

(Continued)

FOREIGN PATENT DOCUMENTS

| CN | 202165912 U | 3/2012 |
|---|---|---|
| CN | 202551795 U | 11/2012 |

(Continued)

*Primary Examiner* — Christopher D Hutchens
(74) *Attorney, Agent, or Firm* — Meenakshy Chakravorty

(57) ABSTRACT

A horticultural lighting apparatus for illuminating a plant comprises a lighting module with multiple lighting elements. The lighting module is restricted to operating in a plurality of discrete modes which emit light with different discrete spectral compositions, by emitting light from the lighting elements in different predetermined combinations. These modes comprise a growth mode configured with a spectrum that promotes growth of the plant, and at least one steering mode configured with a spectrum that steers another biological process of the plant, wherein at least one of the lighting elements is arranged to emit in both the growth and steering modes. The apparatus further comprises a controller arranged to switch the lighting module between the plurality of discrete modes.

13 Claims, 3 Drawing Sheets

(51) Int. Cl.
*H05B 47/105* (2020.01)
*H05B 47/155* (2020.01)
*A01G 9/14* (2006.01)
*A01G 9/20* (2006.01)

(52) U.S. Cl.
CPC .......... *H05B 47/11* (2020.01); *H05B 47/155* (2020.01); *Y02P 60/146* (2015.11)

(58) Field of Classification Search
CPC .. A01G 9/249; H05B 37/029; H05B 37/0227; H05B 37/0218; H05B 37/0281; Y02P 60/146; F21V 23/003; F21S 10/02; F21S 4/24; G01J 3/46
USPC ................. 315/152, 307; 362/231; 514/733; 700/90; 47/17, 58.1 LS
See application file for complete search history.

(56) References Cited

U.S. PATENT DOCUMENTS

| | | |
|---|---|---|
| 2010/0277078 A1 | 11/2010 | Morton |
| 2011/0125296 A1 | 5/2011 | Bucove et al. |
| 2012/0020071 A1 | 1/2012 | McKenzie |
| 2012/0170264 A1 | 7/2012 | McKenzie et al. |
| 2013/0139437 A1 | 6/2013 | Maxik et al. |
| 2013/0326941 A1* | 12/2013 | Pickett .................. A01G 7/045 47/1.4 |
| 2014/0152194 A1* | 6/2014 | Beyer .................... A01G 7/045 315/294 |
| 2014/0259905 A1* | 9/2014 | Ovadya ................. A01G 22/00 47/58.1 LS |
| 2015/0128489 A1* | 5/2015 | Yamada ................ A01G 7/045 47/58.1 LS |
| 2015/0150195 A1* | 6/2015 | Grajcar ................. A01G 7/045 47/58.1 LS |
| 2015/0181811 A1* | 7/2015 | Krijn ..................... A01G 7/045 47/58.1 LS |
| 2015/0313092 A1* | 11/2015 | Pocock .................. A01G 22/00 47/58.1 LS |
| 2016/0057944 A1* | 3/2016 | Smits ..................... A01G 9/26 362/373 |
| 2017/0034895 A1* | 2/2017 | Vogel ..................... A01G 22/00 |
| 2017/0094756 A1* | 3/2017 | Saffari ................. H05B 37/0272 |

FOREIGN PATENT DOCUMENTS

| | | |
|---|---|---|
| CN | 202647292 U | 1/2013 |
| JP | H10-178899 A | 7/1998 |
| JP | 2002272272 A | 9/2002 |
| JP | 2009136155 A | 6/2009 |
| JP | 2012070727 A | 4/2012 |
| WO | 2008078277 A1 | 7/2008 |
| WO | 2008118080 A1 | 10/2008 |
| WO | 2012108365 A1 | 8/2012 |

* cited by examiner

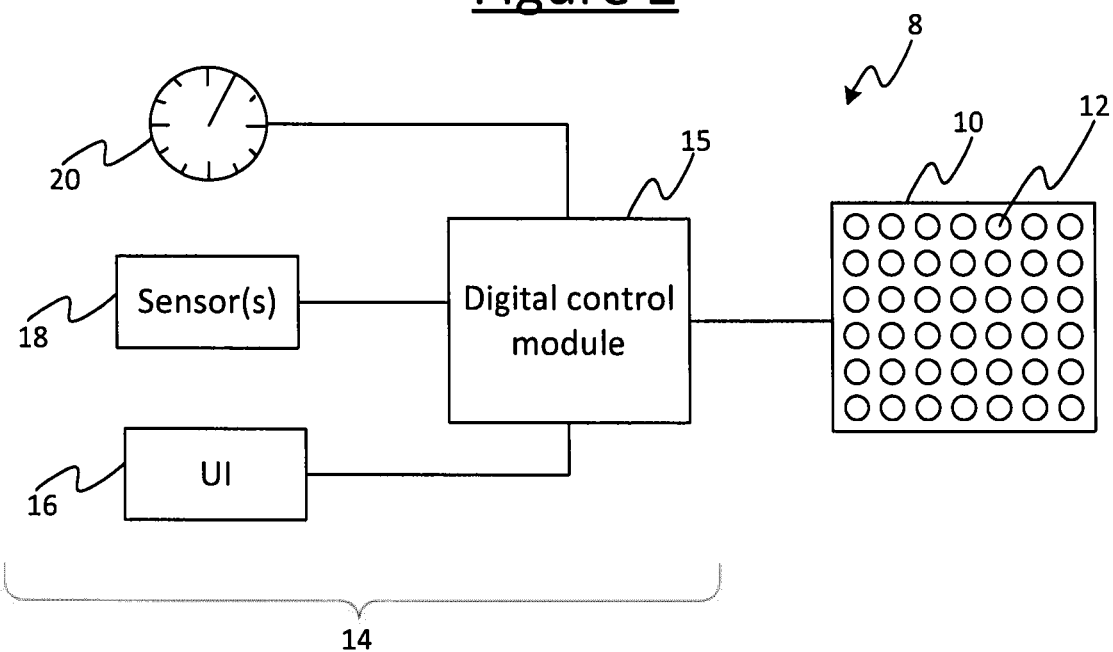
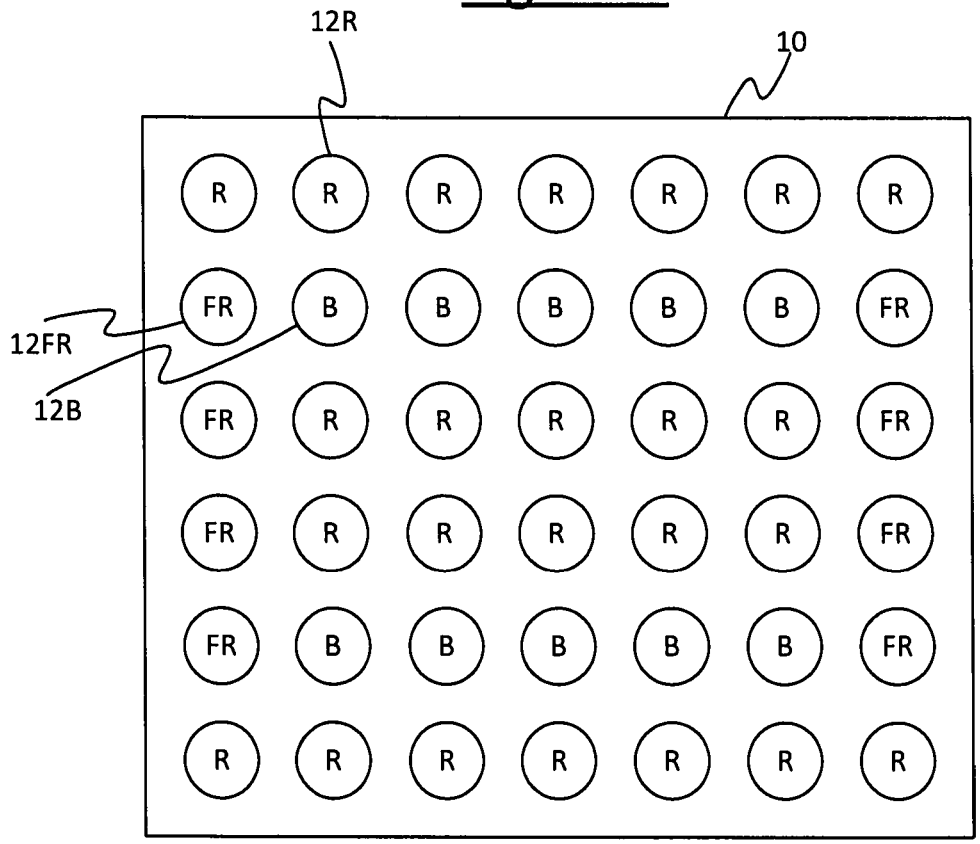

HORTICULTURAL LIGHTING APPARATUS

CROSS-REFERENCE TO PRIOR APPLICATIONS

This application is the U.S. National Phase application under 35 U.S.C. § 371 of International Application No. PCT/EP2015/062485, filed on Jun. 4, 2015, which claims the benefit of European Patent Application No. 14177493.5, filed on Jul. 17, 2014. These applications are hereby incorporated by reference herein.

TECHNICAL FIELD

The present disclosure relates to horticultural lighting apparatus for illuminating one or more plants to promote growth, and also to steer one or more other biological processes of the plants such as flowering or resistance against disease.

BACKGROUND

Plants use the process of photosynthesis to convert light, $CO_2$ and $H_2O$ into carbohydrates (sugars). These sugars are used to fuel metabolic processes, and the excess of sugars are used for biomass formation. This biomass formation can include stem elongation, increase of leaf area, flowering, and/or fruit formation. The photoreceptor responsible for photosynthesis is chlorophyll.

Apart from photosynthesis, there are at least three other types of process related to interaction between radiation and plants: photoperiodism, phototropism and photomorphogenesis. Photoperiodism refers to the ability that plants have to sense and measure the periodicity of radiation (e.g. to induce flowering). Phototropism refers to the growth movement of the plant towards or away from the radiation. Photomorphogenesis refers to a change in form in response to the quality and/or quantity of radiation.

Artificial lighting in greenhouses is currently used for promoting plant growth, but also to steer certain other processes in the plant development, such as inducing flowering. The requirements for these two types of illuminations are different, in terms of both intensity and spectrum. Therefore artificial lighting can play a variety of roles in horticultural lighting, mainly falling into two groups: growth, and steering of other biological processes other than growth.

A growth light source is a light source that supplements or replaces the natural daylight, e.g. in greenhouses or growingfactories. It is used in order to increase production (of tomatoes for example), to enable crop growth without daylight in plant factories, and/or to extend crop production during the autumn, winter, and spring period when crop prices are higher.

A steering light source on the other hand is used to promote one or more other biological processes of the plant or plants. Examples are as follows.

Photoperiodic lighting exploits the fact the daily duration of light is important for many plants. For instance LED lamps may be used to extend day length to control flowering, or to induce other photoperiodic responses such as to break the winter dormancy of respiratory plants like chrysanthemums and strawberries. E.g. the ratio of the light and dark period in a 24 hour cycle can influence the blossoming response in a number of plants, and manipulating this ratio by means of supplemental lighting enables regulating the time of blossoming and the morphology of the flower (such as thickness and length).

Certain doses of light can also increase a plant's resistance to disease. E.g. several studies have shown lower intensity lighting during the night can help plants to strengthen their systemic resistance against diseases. Light spectrum also plays a role here.

Light spectrum can also influence the morphological development of the plant. For instance it has been proven that the amount and/or percentage of blue light is for a large part responsible for compact plant architectures (short internode distances and petioles) while far-red light has the opposite effect by inducing stem elongation and larger leaf areas.

Furthermore, light can be used to steer the nutrient content of a final product. E.g. for vegetables grown in absence of daylight, it has been shown that pre-harvest steering light would boost the nutrients to be optimum for the market. For instance: reduction of nitrate content in leafy vegetables can be obtained by applying high intensity, continuous lighting 48 hours prior harvest; an increases of anthocyanin (red coloration of salad) can be obtained by applying intense blue or UV light; and a short-term (3 days) pre-harvest treatment of microgreens with intense red light also increases the phytochemicals.

Regarding the wavelength of the light, the main photosynthetic activity of a plant takes place within the wavelength range 400-700 nm, peaking in the red (625-675 nm) and blue (425-475 nm) regions. Radiation within the 400-700 nm range is called photosynthetically active radiation (PAR) and is responsible for plant growth. Blue light governs leaf formation, whereas red and far-red promote stem growth and flowering (flowering also strongly depends on the timing of the lighting, such that flowering can be induced by appropriate timing of the lighting). Low fluences of red light have been proven to increase the plant resistance against diseases.

In horticulture, light fluence is measured in the number of photons per second per unit area (e.g. in micromol/sec/m$^2$, a mol corresponding to $6\times10^{23}$ photons). For example, when applying inter-lighting for tomatoes, the typical fluence used is 110 μmol/sec/m$^2$ with the ratio of blue:red close to 1:7.

Traditional horticultural illumination systems are based on high pressure Sodium lamps (for growth) or incandescent lamps (for flowering). These have a fixed spectrum and are, mostly, also fixed in terms of light output intensity.

More recently, the advent of solid-state lighting based on LEDs has offered new opportunities for application in horticulture. The main advantages of using LEDs result from the ability to tune the spectral composition of the light to closely match the plant's photoreceptors. Together with additional benefits like dimming capabilities, improved heat control and freedom of distributing the LEDs, this provides a more optimal plant growth and crop yield and enables influencing the plant's morphology and composition. LEDs also promise reduced energy consumption (and associated cost reduction) compared to more conventional light sources such as gas discharge lamps or incandescent lamps. For instance, as well as their intrinsically higher efficiency, LEDs may also allow the light to be distributed closer to the target which can result in less light loss through the roof and floor of the greenhouse. Moreover, a better light distribution in the crop can be accomplished. This can be beneficial in a number of applications such as high-wire crops like tomatoes.

LEDs emit radiation within a narrow wavelength spectrum. For example a typical LED may have an emission peak at 450 nm (blue), 660 nm (red), or 730 nm (far-red). It is also possible to create an LED that provides a broad white spectrum (400-750 nm) by coating an LED of one colour with a material such as phosphor. Combinations of such LEDs can be used to create different spectra.

A number of horticultural LED lamps are already available on the market for professional commercial growers. To keep cost low these have their light spectrum and output fixed, tuned to match the requirements of either growth light if the lamp is a growth lamp or steering light of the lamp is a steering lamp.

For research purposes, more flexible systems are also offered which have the possibility to dim the light output of individual colours to any desired level. In case the light module is equipped with, for example, red and blue light emitting LEDs; and dimming can be performed separately for each of the colours, allowing the researcher to achieve any desired light composition. These complex systems offer a high degree of flexibility, but are complex for a horticultural grower (as opposed to a researcher) to use, and also add additional cost making them economically unaffordable for the horticulture industry.

SUMMARY

Therefore at one end of the range, the existing products on the market provide a light module with a fixed ratio of e.g. blue, red and far-red, where only the overall intensity (or even only on/off) is controllable. Advantages of this are low cost and ease of use, but a disadvantage is that such lamps allow little in the way of controllability. At the other end of the range there are research modules for individually controlling the intensity of e.g. blue, red and far-red. An advantage of this is a high degree of controllability, but a disadvantage is high cost and complexity of use. It would be desirable to provide a more simple way of constructing and controlling a horticultural lamp that can be used to provide both growth and steering light, that maintains a degree of controllability while keeping the cost and complexity of light control low.

According to one aspect disclosed herein, there is provided a horticultural lighting apparatus for illuminating a plant. The apparatus comprises: a lighting module comprising multiple lighting elements (e.g. LEDs), wherein the lighting module is restricted to operating in only a plurality of discrete modes which emit light with different discrete spectral compositions by emitting light from the lighting elements in different predetermined combinations. These modes comprise a growth mode configured with a spectrum that promotes growth of the plant, and at least one steering mode configured with a spectrum that steers another biological process of the plant (for example a photoperiodic process, a phototropic process, or photomorphogenic process; e.g. flowering, or resistance to disease). As the modes are modes of a given lighting module rather than properties of separate lighting modules, at least one of the lighting elements is common to each mode, being arranged to emit in both the growth and steering modes. The apparatus further comprises a controller arranged to switch the lighting module between the plurality of discrete modes.

The disclosure thus provides a horticultural lighting apparatus (e.g. LED lamp) that combines growing and steering illumination modes in a simple and cost effective way, together with methods for controlling the light output of such a lamp based on factors such as the objective of the grower, stage of the day, and/or the status of the crop. The disclosed horticulture module falls between the existing products that are available, providing a trade-off between flexibility, cost, and simplicity for the user; having a dedicated light setting for evoking a dedicated effect on the plants in each of the modes. Advantages may include a reduction in cost (fewer light modules and less heavy installation) and/or simpler operation (limited number of selectable, preconfigured modes, not requiring a recipe management system).

In embodiments, the different combinations may be formed by switching the lighting elements on and off in different predetermined patterns (e.g. see FIGS. 4 and 5). Alternatively or additionally, the different combinations may be formed by emitting light from the lighting elements with different predetermined combinations of intensities.

In embodiments, the controller may be configured to switch the lighting module between the grow mode and the at least one steering mode at different respective phases of a daily cycle. For example, the controller may be configured to switch the lighting module to the growth mode during a daytime phase of the daily cycle, and to switch the lighting module to a night-time phase of the daily cycle. E.g. the controller may be configured to determine the phase of the daily cycle according to a predetermined schedule.

Alternatively or additionally, the controller comprises one or more sensors, wherein the controller is configured to switch between the growth mode and the at least one steering mode based on the one or more sensors, and/or to control a duration of the at least one steering mode based on the one or more sensors. For example the one or more sensors may comprise: a daylight sensor arranged to sense a light level of the daylight, the controller being configured to switch between the grow mode and the at least one steering mode based on the sensed light level, and/or to control a duration of the at least one steering mode based on the sensed light level; a daylight sensor arranged to sense a spectral composition of the daylight, the controller being configured to switch between the grow mode and the at least one steering mode based on the sensed spectral composition of the daylight, and/or to control a duration of the at least one steering mode based on the sensed spectral composition of the daylight; a humidity sensor, the controller being configured to switch between the grow mode and the at least one steering mode based on the sensed humidity, and/or to control a duration of the at least one steering mode based on the sensed humidity; a temperature sensor, the controller being configured to switch between the grow mode and the at least one steering mode based on the sensed temperature, and/or to control a duration of the at least one steering mode based on the sensed temperature; a plant growth performance sensor and/or other form of plant health sensor, the controller being configured to switch between the grow mode and the at least one steering mode based on the sensed growth and/or health of the plant, and/or to control a duration of the at least one steering mode based on the sensed growth and/or health of the plant; and/or a plant morphology sensor, the controller being configured to switch between the grow mode and the at least one steering mode based on the sensed morphology of the plant, and/or to control a duration of the at least one steering mode based on the sensed morphology of the plant.

In embodiments, the one or more sensors may be at least one of the means by which the controller determines the phase of the daily cycle (either the only means, or used in addition to one or more other means such as the predetermined schedule, e.g. adapting the switching times of the schedule within allowed limits of the schedule based on the sensory input).

In yet further embodiments, the controller may comprise a user interface (e.g. a switch or computer terminal), being configured to switch between the growth mode and the at least one steering mode based on a user input received through the user interface.

The lighting module may be restricted to having only a single available steering mode such that the apparatus is restricted to only two modes, growth or steering; or alternatively the lighting module may allow a small number of multiple discrete steering modes. In the case of multiple steering modes, the controller may be configured to apply each of the multiple steering modes in a sequence at different respective times during the night-time phase.

According to another aspect disclosed herein, there may be provided a horticultural grow lamp having a housing and comprising the apparatus of any of the disclosed embodiments (including at least the lighting module and controller) incorporated into said same housing.

According to another aspect, there may be provided a horticultural growing facility comprising: one or more plants, and a lighting module and controller in accordance with any of the embodiments disclosed herein, the lighting module being arranged to illuminate the one or more plants. For example the horticultural growing facility may take the form of a greenhouse or plant growing factory in which the plants and lighting module are accommodated.

BRIEF DESCRIPTION OF THE DRAWINGS

To assist understanding of the present disclosure and to show how embodiments may be put into effect, reference is made by way of example to the accompanying drawings in which:

FIG. 2 is a schematic block diagram of a horticultural lighting apparatus,

FIG. 3 is a schematic representation of a lighting module,

DETAILED DESCRIPTION OF EMBODIMENTS

The following describes a light module comprising a controller for controlling a light module in at least two (exclusive) operating modes, of which one mode is for providing a grow light during a 'day' period in a 24 hour cycle and another mode is for providing a steering light during a 'night' period in a 24 hour cycle. E.g. the steering light may be one of a flowering light, a disease reducing light and a morphology controlling light.

A user interface (either a switch, a remote control of a recipe computer) may provide the input for selecting one of the at least two modes. Alternatively or additionally, intelligence is added to the controller of the lighting module to select between the modes in an automated or at least partially automated manner. For example, the control of the lighting module may also or alternatively be based on sensor data related to the environment (e.g. a daylight sensor, a time of day, plant/crop growth stage, relative humidity for assessing disease risk, etc.) wherein the controller switches between the different operating modes based on sensed environmental data. And/or as another example, the switching may be based on a timer according to a predetermined schedule preconfigured in the controller.

In embodiments, the lighting module may allow only a growth mode and a single steering mode. Alternatively multiple steering light modes may be applied during non-overlapping periods. In any of these modes, the light module may be controlled to provide continuous light or pulsed on/off light with light pulses of the order of minutes.

Figure 1:
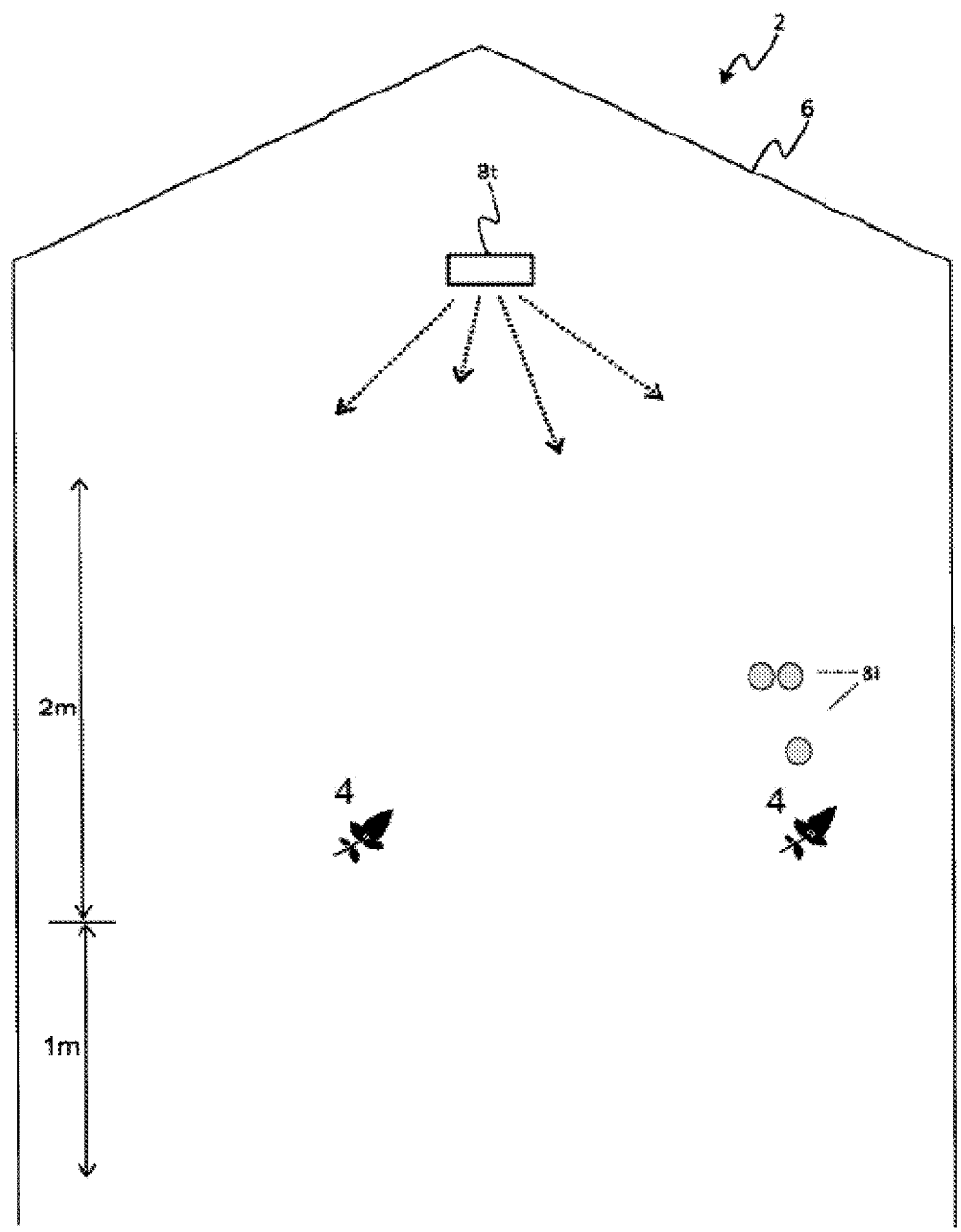
FIG. 1 is a schematic illustration of a horticultural growing facility.

FIG. 1 shows a horticultural growing facility 2 comprising a greenhouse 6 or plant growing factory. The greenhouse or factory 6 contains one or more plants 4 (e.g. tomatoes), and one or more instances of a horticultural lighting apparatus 8 arranged to illuminate the one or more plants 4. The lighting apparatus 8 may be used to provide supplemental lighting to supplement daylight (e.g. in a greenhouse) or even to provide the only light instead of daylight (e.g. in an indoor growing factory). For instance in the example shown, two plants 4 or rows of plants are both illuminated from above by a top-lighting apparatus 8$t$, while each plant 4 or group of plants in a given row is alternatively or additionally illuminated by an inter-lighting apparatus 8$i$ positioned amongst the plant or group of plants. FIG. 1 also shows an example layout for the hydroponic growth of tomatoes in greenhouses with a service path between rows of tomatoes, but it will be appreciated this is illustrative and by no means limiting to all scenarios to which the teachings herein may be applied.

FIG. 2 gives a block diagram of a horticultural growing apparatus 8 in accordance with embodiments disclosed herein, e.g. as may be used to implement instances of the top-lighting 8$t$ or inter-lighting 8$i$. The horticultural lighting apparatus 8 comprises a lighting module 10 comprising multiple lighting elements 12 (e.g. LEDs), and a controller 14 connected to control the lighting module 10 to switch between modes. The controller 14 comprises one or more of: a user interface (UI) 16, one or more sensors 18, and/or a timer 20. In embodiments, the lighting module 10 and the controller 14 (including its UI 16, sensors(s) 18 and/or timer 20) may be integrated together into the housing of a horticultural grow lamp. Alternatively some or all of the controller 14 may be implemented in a separate unit, such as a computer terminal, connected to the lighting module 10 via a wired or wireless connection.

Figure 4:
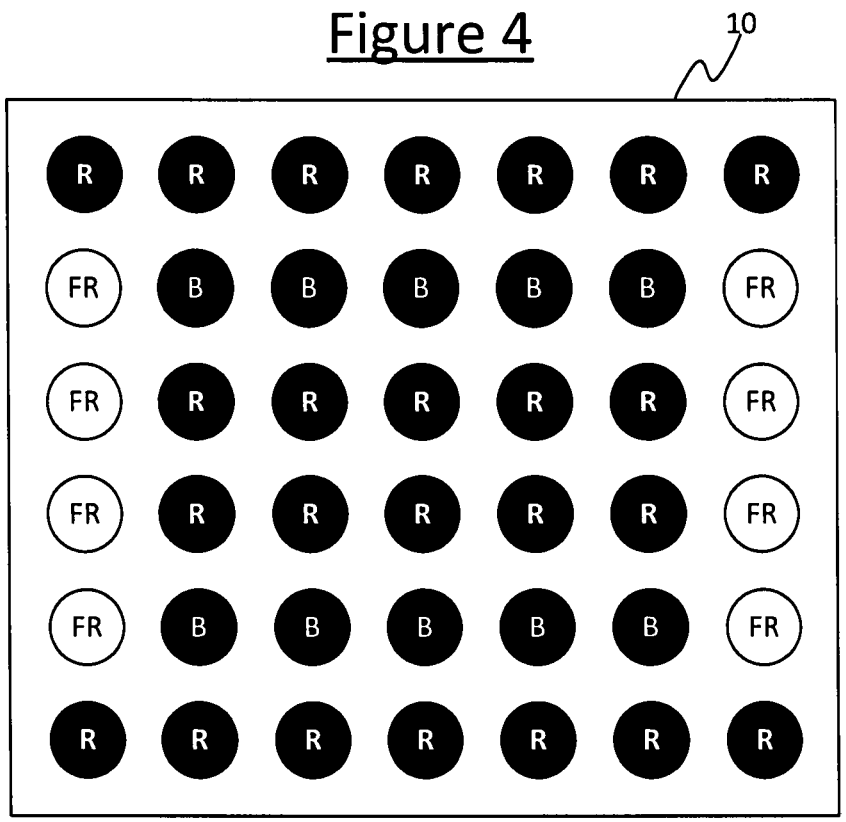
FIG. 4 is a schematic representation of a lighting module in a growth mode.
Figure 5:
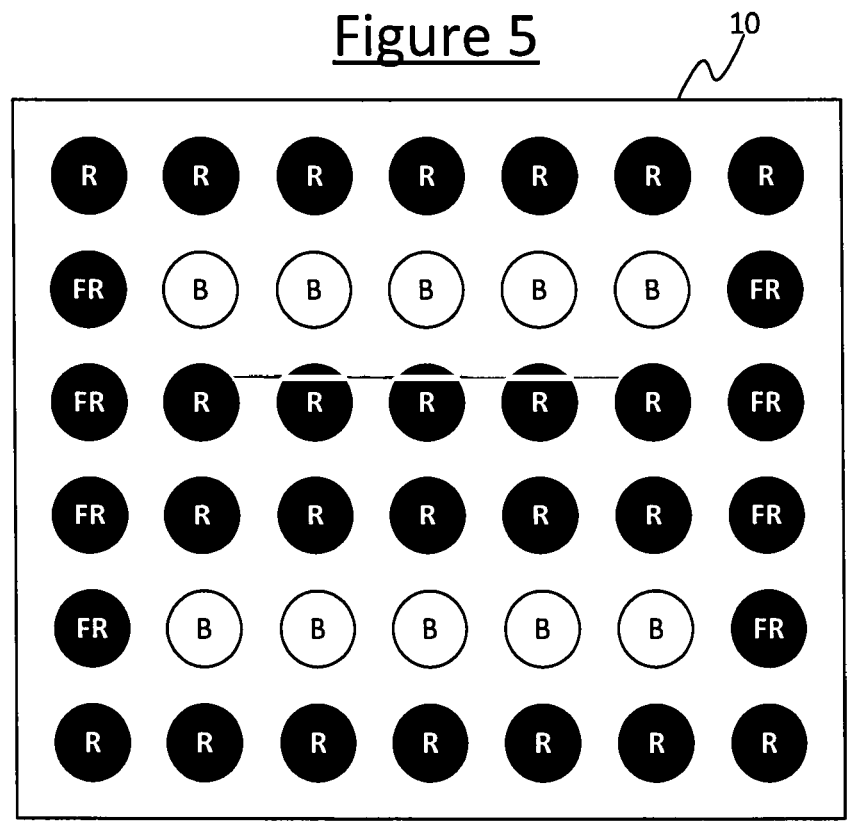
FIG. 5 is a schematic representation of a lighting module in a steering mode.

FIGS. 3, 4 and 5 schematically illustrate an example of the lighting module 10, e.g. as might be used in the top-lighting 8$t$ or other horticultural lighting apparatus. The lighting module comprises the plurality of lighting elements 12 each of which in preferred embodiments is a respective LED (and will be described as such in the following, although it will be understood that more generally they could be other types of lighting element). Each LED 12 is designed to emit with a given colour, with the different LEDs 12 being of at least two different colours; i.e. some of the LEDs 12 are of one colour, others of the LEDs 12 are of another colour, and (if more than two colours of LED are used) yet others of the LEDs 12 are of yet another colour and so forth. For instance in the example shown, some of the LEDs 12 are blue LEDs 12B (emission peak at 400-500 nm, e.g. 450 nm); some are red LEDs 12R (emission peak at 600-700 nm, e.g. 660 nm), and some are far-red LEDs 12FR (emission peak at 700-800 nm, e.g. 740 nm). The LEDs 12 may be arranged in a two dimensional array, e.g. in a rectangular grid as in the illustrated example, or in some other formation; so long as the light emitted by the different colours of LED 12, as incident on the one or more plants, will blend to at least some extent. In one embodiment the LEDs may be arranged in a 7×6 grid with the colours shown in FIGS. 3-5 (though not necessarily to scale), but it will be appreciated this is an example and need not be limiting to all possible embodiments.

The LEDs 12 are arranged into two groups for providing light in two different modes: growth and steering. At least one LED 12 or a sub-group of the LEDs 12 with similar spectrum belongs to both groups and is used in common (both modes). The relative contribution of at least one group of LEDs 12 to the total output is different in the two modes (different spectral composition).

In embodiments the growth mode is characterized by a relatively high light fluence (e.g. 100-200 µmols/m$^2$/s) with a large contribution of this in the red part of the spectrum (e.g. 70%-90%). The light emitted in the steering mode on the other hand is configured with a different spectrum than the growth mode (and in embodiments also a different intensity) in order to promote a different biological process of the plant 4 other than growth. In embodiments the intensity of the steering light may be relatively low (e.g. 0-50 µmols/m$^2$/s) and the spectral composition is dependent on the effect the grower wants to achieve, e.g. such as one or more of the effects discussed previously. The light spectrum and/or intensity in the growth mode and/or steering mode may also be dependent on the type of crop or plant it is designed for, i.e. configured for a particular plant or crop type. Pulse width modulation (PWM) may be used to dim the different light channels (different colours). Besides this high frequency pulsing (>100 Hz), in embodiments the steering light may be offered in continuous mode or in a pulsed mode with pulses at larger time intervals (e.g. 1-60 minutes) depending on the effect desired and the underlying triggering mechanisms.

FIG. 3 shows the lighting module 10 when turned off (none of its LEDs 12 on, i.e. none emitting). FIG. 4 shows the lighting module in an example of a growth mode, whereby a first group of the LEDs 12 are turned on (emitting) and the rest are off (not emitting). In the example shown the growth mode is configured such that all the blue LEDs 12B and red LEDs 12R are on but all the far-red LEDs 12FR are off. FIG. 5 shows the lighting module in an example of a steering mode, whereby a second group of the LEDs 12 are turned on (emitting) and the rest are off (not emitting). In the example shown the steering mode is configured such that all the red LEDs 12R and far-red LEDs 12FR are on, while all the blue LEDs 12B are off. Note that some but not all of the LEDs of the first group (on in growth mode) are common to the second group (on in steering mode).

The controller 14 is configured to control the lighting module 12 to switch between the growth and steering modes. The controller 14 may take a number of possible forms. In embodiments the controller 14 takes the form of a digital control module 15 connected to control the mode of the lighting module 10, plus an associated UI 16, sensors(s) 18 and/or timer 20 connected via a wired or wireless connection to provide an input to the control module 15; the control module 15 being configured to control the lighting module 10 to switch between the growth and steering modes based on the input or inputs it receives from the UI 16, sensor(s) and/or timer 20.

The digital control module 15 may be implemented as a portion of software code stored on a memory of the controller 14 and arranged to be executed on one or more processors of the controller 14. For example the controller 14 may comprise a computer terminal such as a desktop or laptop computer, tablet or smart phone upon which the control module 15 is installed and executed; or the controller may comprise a memory and application specific microprocessor of a dedicated control unit, e.g. embedded in a horticultural grow lamp. Alternatively, the digital control module may be wholly or partially implemented in dedicated hardwired circuitry, and/or in configurable or reconfigurable circuitry such as a PGA or FPGA. Note that where the control module 15 is implemented in software executed on a processor, the timer 20 (if used) may take the form of a general purpose clock or other timer of the processor plus associated software, or alternatively may take the form of a separate timer peripheral.

In embodiments, the control module 15 is an automated control module configured to automatically switch between the growth and steering modes based on one or more of: time of day, crop growth stage (measured or pre-set as a function of growth period), day length (inferred from calendar date or from sensor readings), spectral composition of the daylight (e.g. sensor readings of red/far red ratio or PSS value), and/or one or more sensor readings (e.g. relative humidity and/or temperature for assessing disease risk). In embodiments the control module 15 automatically switches the steering light on (with or without a time delay) after the growth light has been switched off.

In some embodiments, the lighting module 10 has only two modes: a growth mode and one steering mode. Alternatively, the lighting module may allow a small number of different steering modes (but in embodiments still only a single growth mode). For example the lighting module 10 may be switched between various functions for the steering light; e.g. modes having different light intensity and/or spectra for flowering, disease resistance, and/or morphology steering. In embodiments, the lighting module 10 has only two or fewer steering modes, only three or fewer steering modes, only four or fewer steering modes, only five or fewer steering modes, or only ten or fewer steering modes.

Either way, whether one or a few steering modes are allowed, note that the modes are discrete modes of the lighting module 10, in that the lighting module 10 is constricted to operating only in a small number of modes (corresponding to a small number of respective combinations of the LEDs 12) that is substantially smaller than if the spectrum and/or light intensity could be set to any arbitrary value (based on any possible on-off and/or brightness settings of the LEDs 12). So the number of modes is substantially smaller than the number of possible combinations in which the LEDs 12 of the lighting module can be turned on and off, e.g. at least a factor of ten smaller, at least a factor of one-hundred smaller, at least a factor of one-thousand smaller, or at least a factor of ten-thousand smaller, etc. (depending on the number of LEDs 12 and therefore the number of theoretical combinations); and preferably only a handful of modes are allowed (e.g. less than or equal to two, less than or equal to three, less than or equal to four, less than or equal to five, or less than or equal to ten steering modes; and in embodiments only one growth mode).

Preferably in order to reduce complexity of control, this restriction to a small number of discrete modes is an intrinsic, hardwired property of the lighting module 10 itself. For example, the lighting module 10 may comprise two control wires via which the controller 14 is connected to switch the module 10 between the growth and steering light based on an applied control voltage, e.g. a voltage difference between the two wires (and of these two control wires, one wire can be in common with the wires providing the power). Alternatively however, the restriction may be enforced by the controller 14.

Note also that in the case of a digital controller 15, discrete means constrained to substantially fewer modes than the limit on the number of combinations of levels inevitably resulting from the digital representation of a value. I.e. for the purpose of the present disclosure, a digital variable is considered to be effectively continuously variable (and therefore not discrete) if the only constraint on the number of possible values it can take is the quantisation due to the digital nature of the controller.

Some possibilities for controlling the switching between the modes are now discussed in more detail.

In a first embodiment, the controller 14 comprises the digital control module 15 and timer 20, and is configured to control the switching between the growth mode and the one or more steering modes according to a predetermined schedule (by timing the current time using the timer and comparing the current time to the schedule). In embodiments the controller 14 also comprises a user interface (UI) 16 and the schedule can be programmed by a user via the UI 16. For example the controller 14 may take the form of a computer terminal on which the control module 15 is implemented, and the UI 16 may comprise a display and input means (e.g. mouse, keyboard and/or touch screen) of this computer terminal. Alternatively the control module 15 may be pre-programmed with the schedule by a manufacturer, supplier or commissioning technician.

According to the first embodiment, the schedule may comprise a daily schedule, and/or a schedule varying over a longer period such as a weekly, monthly and/or yearly calendar (e.g. so the daily schedule varies over a number of days, weeks, months or years).

Preferably the schedule comprises at least a daily schedule, whereby the control module 15 switches the lighting apparatus 10 between the different modes at different times of a 24 hour daily cycle. According to this schedule, the growth mode is preferably used to supplement daylight (during the day and/or at night); while the steering mode may mainly be used during the night or at the end of the day, when the contribution from the daylight becomes very limited. Thus the lighting module is used to promote growth during the day, and promote one or more other biological processes such as flowering or disease resistance during the night. If there are multiple different steering modes, the daily schedule may comprise switching between the different steering modes at different times of night; e.g. switching from flowering mode to disease-resistance mode part way through the night, or alternating between the two modes over the course of the night.

Alternatively or additionally, the schedule may vary the switching behaviour over a course longer than a single day. For example, the length of time for which the growth mode is applied during the day, and/or the length of time for which the steering mode(s) is (or are) applied during the night, may be scheduled to vary day-by-day, week-by-week, or month-by-month depending on the crop growth stage, current day-length and/or season as inferred from the current calendar date.

In a second embodiment, the controller 14 comprises the digital control module 15 and one or more sensors 18, and is configured to control the switching between the growth mode and the one or more steering modes based on the respective input or inputs from the one or more sensors 18. For example the sensor(s) 18 may comprises a daylight sensor arranged to measure the current amount of daylight experienced in the facility 2, a daylight sensor arranged to measure the current spectral composition of the daylight experienced in the facility 2 (this may use the same or a different photocell), a humidity sensor arranged to measure the current humidity in the facility 2, and/or a temperature sensor arranged to measure the current temperature in the facility 2. Preferably the one or more sensors are placed in suitable vicinity of the plant or plants 4 in question so as to approximate the conditions (e.g. light and/or humidity) experienced by those one or more plants 4.

For example, the control module 15 may be configured to infer the current day length and/or crop growth stage based on the sensed daylight level and/or spectrum, and/or the sensed humidity, and may switch between the modes based on this. For example, the control module 15 may infer the day length based on one or more sensors 8, and trigger the growth mode to be applied during the inferred day time and the one or more steering modes to be applied during the inferred night time. And/or, the control module 15 may infer the current crop growth stage or season based on one or more sensors 18, and may vary the length of time the growth mode and/or steering mode(s) is (or are) applied for depending on the inferred growth stage or season.

In another example, a current disease risk may be correlated with the humidity and/or temperature experienced by the plant(s) 4, and the control module 15 may be configured to activate the disease-resistance steering mode (or change the length of this mode) in response to sensing a certain level of humidity or temperature or certain combinations of humidity and temperature.

In another example, a dedicated plant health sensor can be used to sense one or more aspects of the plant's health, such as to provide an early indication of disease. The plant health sensor may comprise a plant growth performance sensor for taking photosynthesis (growth) measurements, such as a Chlorophyll Fluorescence sensor such as an Allied Vision AVT camera). For instance, the growth (chlorophyll fluorescence) measurements can be used as an early, indirect indication for diseases. However, maybe there are other measurements of plant growth or plant health generally as well. For instance, the growth may also be inhibited by other factors (e.g. water stress).

In yet another example a plant morphology sensors (e.g. Phenospex PlantEye) can be used to sense one or more aspects of the plant's morphology, such as the growth stage of the crop.

The selection and/or the duration of a particular steering mode may be based on one or more sensed values from any one or more of the sensors described above, or others. For example, the daylight sensor may be arranged to determine the switching on/off of the growth mode, while another one or more sensors such as the humidity sensor and/or temperature sensor may be arranged to determine the selection and/or duration of an antifungal steering mode from amongst multiple steering modes. A particular steering mode may not be selected if it is not relevant based on the sensed value(s).

Further, in the second embodiment, the switching between modes may be based solely on the sensor input(s), or may be combined with the first embodiment to adapt the schedule based on empirical data from the sensor(s). E.g. the control module 15 may determine the current day length based on a calendar, so that the growth mode is applied during the day and at least one steering mode is applied during the night, but may also adapt the exact switching time within a predetermined range of the scheduled time based on the sensed humidity and/or daylight spectrum.

According to a third embodiment, the controller 14 comprises a user interface (UI) 16 and is configured to switch between the growth mode and the steering mode(s) based on a manual user selection received through the UI 16. For example the UI may comprise a remote control able to control the switching via a control module 15; or the user interface may comprise an input device such as a keyboard, mouse and/or touchscreen of a computer terminal in which the control module 15 is implemented. Alternatively, the UI 16 may comprise just a dedicated switch (e.g. a mechanical switch) for switching between the modes. In this case the control module 15 is not necessarily needed and the controller 14 may just consists of the switch 16 connected directly to the control wires of the lighting module 10.

In one particular variant of the third embodiment, the user uses the UI 16 only to turn on and off the growth mode, and the control module 15 is configured to automatically switch on the steering mode (or a sequence of steering modes) for a predetermined time after the user has switched off the growth mode. For example, the control module 15 may switch on a red disease-resistance lighting mode for a period such as 2 hours after the user has switched off the growth mode.

Note that in any of the embodiments, the growth mode and steering mode(s) do not necessarily have to be contiguous. E.g. there could be a period of no lighting (at least not from the lighting module 10) between the end of growth mode and the start of the steering mode(s), and/or between the end of the steering mode(s) and the start of the next application of the growth mode, and/or between different steering modes.

It will be appreciated that the above embodiments have been described by way of example. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. Horticultural lighting apparatus for illuminating a plant, the apparatus comprising:
    a lighting module comprising multiple lighting elements, wherein the multiple lighting elements comprise a red light source and a blue light source, wherein the lighting module is restricted to operating in a plurality of discrete modes which emit light with different discrete spectral compositions by emitting light from the lighting elements in different predetermined combinations, wherein at least one of the plurality of discrete modes comprises a predetermined modification to the red light source and a predetermined modification to the blue light source, the modes comprising a growth mode configured with a spectrum that promotes growth of the plant, and at least one steering mode configured with a spectrum that steers a biological process other than growth of the plant, with at least one of the lighting elements being arranged to emit in both the growth and steering modes; and
    a controller arranged to switch the lighting module between the plurality of discrete modes, wherein the controller is configured to switch the lighting module between the grow mode and the at least one steering mode at different respective phases of a daily cycle,
    wherein the biological process other than growth that the at least one steering mode is configured to steer comprises resistance to disease.

2. The apparatus of claim 1, wherein the different combinations are formed by switching the lighting elements on and off in different predetermined patterns.

3. The apparatus of claim 1, wherein the different combinations are formed by emitting light from the lighting elements with different predetermined combinations of intensities.

4. The apparatus of claim 1, wherein the controller comprises one or more sensors and is configured to switch between the growth mode and the at least one steering mode based on the one or more sensors, or to control a duration of the at least one steering mode based on the one or more sensors.

5. The apparatus of claim 4, wherein the one or more sensors comprise one or more of:
    a daylight sensor arranged to sense a light level of the daylight, the controller being configured to switch between the grow mode and the at least one steering mode based on the sensed light level, or to control a duration of the at least one steering mode based on the sensed light level;
    a daylight sensor arranged to sense a spectral composition of the daylight, the controller being configured to switch between the grow mode and the at least one steering mode based on the sensed spectral composition of the daylight, or to control a duration of the at least one steering mode based on the sensed spectral composition of the daylight;
    a humidity sensor, the controller being configured to switch between the grow mode and the at least one steering mode based on the sensed humidity, or to control a duration of the at least one steering mode based on the sensed humidity;
    a temperature sensor, the controller being configured to switch between the grow mode and the at least one steering mode based on the sensed temperature, or to control a duration of the at least one steering mode based on the sensed temperature;
    a plant growth performance sensor or other plant health sensor, the controller being configured to switch between the grow mode and the at least one steering mode based on the sensed growth performance and/or health of the plant, or to control a duration of the at least one steering mode based on the sensed growth performance or health of the plant; or
    a plant morphology sensor, the controller being configured to switch between the grow mode and the at least one steering mode based on the sensed morphology of the plant, or to control a duration of the at least one steering mode based on the sensed morphology of the plant.

6. The apparatus of claim 4, wherein the controller is configured to use the one or more sensors to determine the phase of the daily cycle.

7. The apparatus of claim 1, wherein the controller comprises a user interface, and is configured to switch between the growth mode and the at least one steering mode based on a user input received through the user interface.

8. The apparatus of claim 1, wherein the at least one steering mode comprises multiple steering modes.

9. The apparatus of claim 8, wherein the controller is configured to apply each of the multiple steering modes at different respective times during the night-time phase.

10. The apparatus of claim 1, wherein the biological process other than growth that the at least one steering mode is configured to steer comprises: a photoperiodic process, a phototropic process, or photomorphogenic process.

11. The apparatus of claim 1, wherein the controller is configured to switch the lighting module to the growth mode during a daytime phase of the daily cycle, and to switch the lighting module to the at least one steering mode during a night-time phase of the daily cycle.

12. The apparatus of claim 1, wherein the apparatus is configured to determine the phase of the daily cycle according to a predetermined schedule.

13. A horticultural growing facility comprising:
one or more plants;
a lighting module comprising multiple lighting elements arranged to illuminate the one or more plants, wherein the multiple lighting elements comprise a red light source and a blue light source, wherein the lighting module is restricted to operating in a plurality of discrete modes which emit light with different discrete spectral compositions by emitting light from the lighting elements in different predetermined combinations, wherein at least one of the plurality of discrete modes comprises a predetermined modification to the red light source and a predetermined modification to the blue light source, the modes comprising a growth mode configured with a spectrum that promotes growth of the plant, and at least one steering mode configured with a spectrum that steers a biological process other than growth of the plant, with at least one of the lighting elements being arranged to emit in both the growth and steering modes; and
a controller arranged to switch the lighting module between the plurality of discrete modes wherein the controller is configured to switch the lighting module between the grow mode and the at least one steering mode at different respective phases of a daily cycle,
wherein the biological process other than growth that the at least one steering mode is configured to steer comprises resistance to disease.

* * * * *